US010586429B1

(12) United States Patent
Schueneman

(10) Patent No.: US 10,586,429 B1
(45) Date of Patent: Mar. 10, 2020

(54) METHOD OF PLAYING BLACKJACK WITH STAND "SOFT 17" OPTION WAGER

(71) Applicant: Christopher Schueneman, Lake Charles, LA (US)

(72) Inventor: Christopher Schueneman, Lake Charles, LA (US)

( * ) Notice: Subject to any disclaimer, the term of this patent is extended or adjusted under 35 U.S.C. 154(b) by 0 days.

(21) Appl. No.: 15/999,131

(22) Filed: Aug. 17, 2018

Related U.S. Application Data

(60) Provisional application No. 62/547,430, filed on Aug. 18, 2017.

(51) Int. Cl.
*G06F 17/00* (2019.01)
*G07F 17/32* (2006.01)

(52) U.S. Cl.
CPC ........ *G07F 17/3293* (2013.01); *G07F 17/322* (2013.01); *G07F 17/3272* (2013.01)

(58) Field of Classification Search
None
See application file for complete search history.

(56) References Cited

U.S. PATENT DOCUMENTS 5,280,915 A 1/1994 Groussman
5,632,485 A 5/1997 Woodland et al.
5,836,586 A 11/1998 Marks et al.
5,839,730 A 11/1998 Pike
5,979,897 A 11/1999 Grossman
6,000,699 A 12/1999 Long
6,095,525 A 8/2000 Terminel
6,113,102 A 9/2000 Marks et al.
6,341,778 B1 1/2002 Lee
6,394,456 B1 5/2002 Long
6,450,500 B1 9/2002 Miller
6,773,013 B2 8/2004 Caldwell
6,776,416 B1 8/2004 Jackson
6,808,173 B2 10/2004 Snow
7,080,839 B2 7/2006 Shackleford
7,222,854 B2 5/2007 Sorge
7,568,704 B1 8/2009 Davis et al.
7,648,140 B2 1/2010 Silverman
8,282,460 B2 10/2012 Tarantino
8,337,285 B2 12/2012 Cranford
8,371,917 B2 2/2013 Hall
8,382,114 B2 2/2013 Johnston
8,651,489 B2 2/2014 Hofstein et al.
8,708,793 B1 4/2014 Osman et al.
8,714,553 B2 5/2014 Hong et al.
8,757,624 B2 6/2014 Johnston
9,336,657 B2 5/2016 Rudd et al.
9,401,075 B2 7/2016 Nicely et al.
9,811,980 B1 11/2017 Kowalchuk et al.
2002/0190467 A1* 12/2002 Braun ................ A63F 3/00157 273/274
2009/0291762 A1* 11/2009 Walker .................... G07F 17/32 463/42
2010/0133752 A1* 6/2010 Ko ........................... A63F 1/00 273/292
(Continued)

*Primary Examiner* — Paul A D'Agostino
(74) *Attorney, Agent, or Firm* — Greg Mier

(57) ABSTRACT

A variation of the blackjack card game where players who have not busted in a round of play are given the option of placing a separate bet on the dealer's "soft" 17, which is a hand containing an ace (counted as eleven, as opposed to one) and one or more other cards totaling six.

4 Claims, 7 Drawing Sheets

(56) References Cited

U.S. PATENT DOCUMENTS

| | | | | |
|---|---|---|---|---|
| 2016/0074745 | A1* | 3/2016 | Blaine | A63F 1/00<br>273/292 |
| 2016/0287975 | A1* | 10/2016 | Barragan | A63F 1/00 |

* cited by examiner

METHOD OF PLAYING BLACKJACK WITH STAND "SOFT 17" OPTION WAGER

CROSS-REFERENCE TO RELATED APPLICATIONS

The present application claims priority from provisional patent application No. 62/547,430, filed on Aug. 18, 2017.

STATEMENT REGARDING FEDERAL SPONSORED RESEARCH OR DEVELOPMENT

Not applicable.

FIELD OF THE INVENTION

The subject invention relates generally to the card game known as blackjack. More particularly, the subject invention relates to a variation of the blackjack game.

BACKGROUND OF THE INVENTION

Blackjack, also known as twenty-one, is the most widely played casino game in the world. Blackjack is a card-comparing game between one or more players and a dealer, where each player in turn competes against the dealer, but players do not play against each other. Blackjack is played with one or more decks of fifty-two cards. The object of blackjack is to beat the dealer in one of the following ways:

(1) Get 21 points on the player's first two cards (called a "blackjack"), without a dealer blackjack;
(2) Reach a final score higher than the dealer without exceeding 21; or
(3) Let the dealer draw additional cards until the dealer's hand exceeds 21 (referred to as "busting" or "going bust").

To begin a round of blackjack, one or more players make a wager, or a bet. The dealer then deals a two-card hand to each player. Each player typically receives the cards face up. The dealer also receives two cards, where one card is typically face up and the other card is typically face down (the "hole card"). Face cards (kings, queens, and jacks) are counted as ten points. Aces are counted as 1 point or 11 points. All other cards are counted as the numeric value shown on the card.

After receiving the initial two cards and after seeing the dealer's face up card, each player has up to four standard options: "hit," "stand," "double down," or "split." A "hit" means to receive another card from the dealer. A "stand" means to receive no more cards. A "double down" allows a player to increase his or her initial bet by up to 100% in exchange for committing to stand after receiving one more card. A "split" can occur when the player's first two cards are the same value. In that case, the player has the option of splitting the two cards into two separate hands and placing a second bet equal to the player's initial bet next to the initial bet. If the player chooses to "split," then the dealer deals an additional card for each of the player's two separate hands, after which the player plays out the two separate hands in turn.

After all the players have exhausted the standard options discussed above, and at least one of the players has not busted, the dealer must hit until the dealer's cards total 17 or more points. At many tables the dealer has the option of hitting or standing on a "soft" 17, i.e. a hand containing an ace and one or more other cards totaling six. A player wins a round by not busting and having a total number of points higher than that of the dealer's. The dealer loses a round by busting or having a total number of points less than a player who has not busted. If a player and the dealer have the same number of points, then this is called a "push" and the player typically does not win or lose that hand. If all of the players bust after exhausting the standard options discussed above, then all the players lose and the hand ends automatically without the dealer having to play his or her hand.

The present invention provides another betting option to players when playing blackjack.

BRIEF DESCRIPTION OF THE ATTACHED DRAWINGS

The accompanying drawings are provided for illustration only and are not intended as a definition of the limits of the present invention. The drawings illustrate a preferred embodiment of the present invention.

DETAILED DESCRIPTION OF THE INVENTION

While the present invention will be described with reference to preferred embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
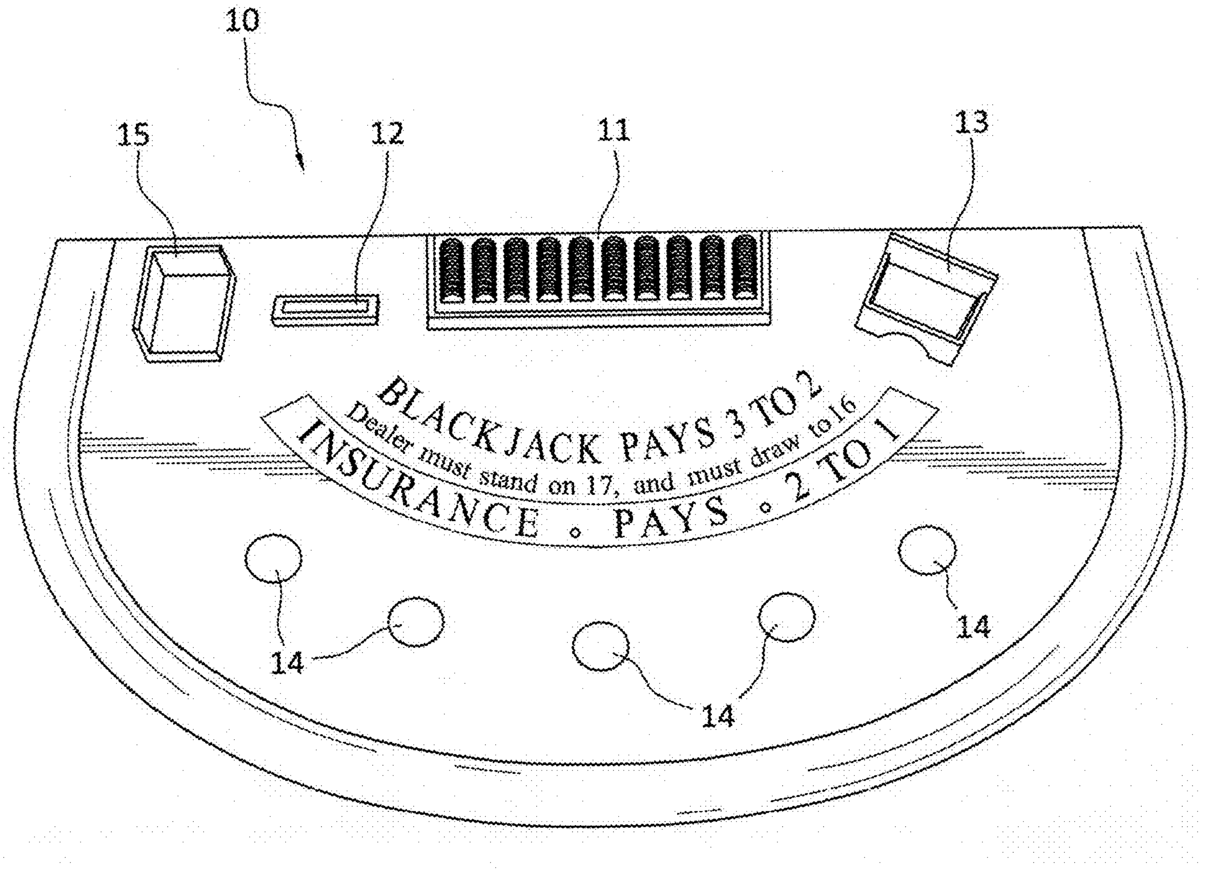
FIG. 1 shows the layout of a typical blackjack table.

FIG. 1 shows the layout of a typical blackjack table 10. A typical blackjack table is semi-circular in shape, where the dealer stands behind the straight side of the table and the players sit or stand along the curved part of the table. The player's position to the dealer's far left is known as "first base" and the player's position to the dealer's far right is known as "third base." A typical blackjack table 10 has a chip rack 11, a currency slot 12, a dealer card shoe 13, betting circles 14, and a used card shoe 15. The chip rack 11 is where chips used in the blackjack game are kept. When a player buys in to the game, he or she is given chips from chip rack 11. When a player wins a hand, he or she is paid from chip rack 11. When a player loses a hand, his chips are taken and returned to chip rack 11. The dealer stands right behind chip rack 11 during play.

Currency slot 12 is used when a player gives the dealer cash to buy chips. Cash is rarely used in a live blackjack game. Players use cash to buy chips. When a player gives the dealer cash to buy chips, the dealer places the cash in currency slot 12.

Shoe 13 is where the cards used in the blackjack game are held before being dealt to the players. The front of shoe 13 is typically slightly sloped to allow a dealer to slide out one card at a time when dealing to the blackjack players.

Betting circles 14 are the areas where a player places his or her bet and the area where the player's card are dealt. FIG. 1 shows five betting circles, indicating that the blackjack table shown in FIG. 1 can accommodate up to five blackjack players. Some blackjack tables can accommodate up to seven blackjack players.

Used card shoe 15 is where cards that have already been used in a blackjack round are placed for reshuffling.

As shown in FIG. 1, a typical blackjack table 10 has phrases written directly on it. One phrase shown in FIG. 1 is "Blackjack Pays 3 to 2." This phrase is designed to remind players that a blackjack (when a player gets 21 points on the player's first two cards, without a dealer getting 21 points on the dealer's first two cards) is paid off at higher odds than when a player has a total of 21 points or any other winning hand. To qualify for the higher odds, a player's first two cards must be an ace and a ten (10, Jack, Queen, or King).

Another phrase typically on a blackjack table is "Dealer must stand on 17 and must draw to 16." This phrase tells the players the rules set by the casino for the dealer.

Another phrase typically on a blackjack table is "Insurance Pays 2 to 1." This phrase refers to a side bet that is available to players when the dealer's up card is an ace. The player is offered the option of taking "insurance" before the dealer checks the down card. Insurance is a side bet that the dealer has blackjack and is treated independently of the main wager. It pays 2 to 1 (meaning that the player receives two dollars for every dollar bet). The idea is that the dealer's down card has a fairly high probability (nearly one-third) to have a value of ten, resulting in the dealer scoring a blackjack. The insurance side bet is attractive (although not necessarily wise) for the player to insure against the possibility of a dealer blackjack by making a maximum "insurance" bet, in which case the "insurance proceeds" will make up for the concomitant loss on the original bet. The player may add up to half the value of their original bet to the insurance and these extra chips are placed on a portion of the table usually marked "Insurance Pays 2 to 1."

Figure 3:
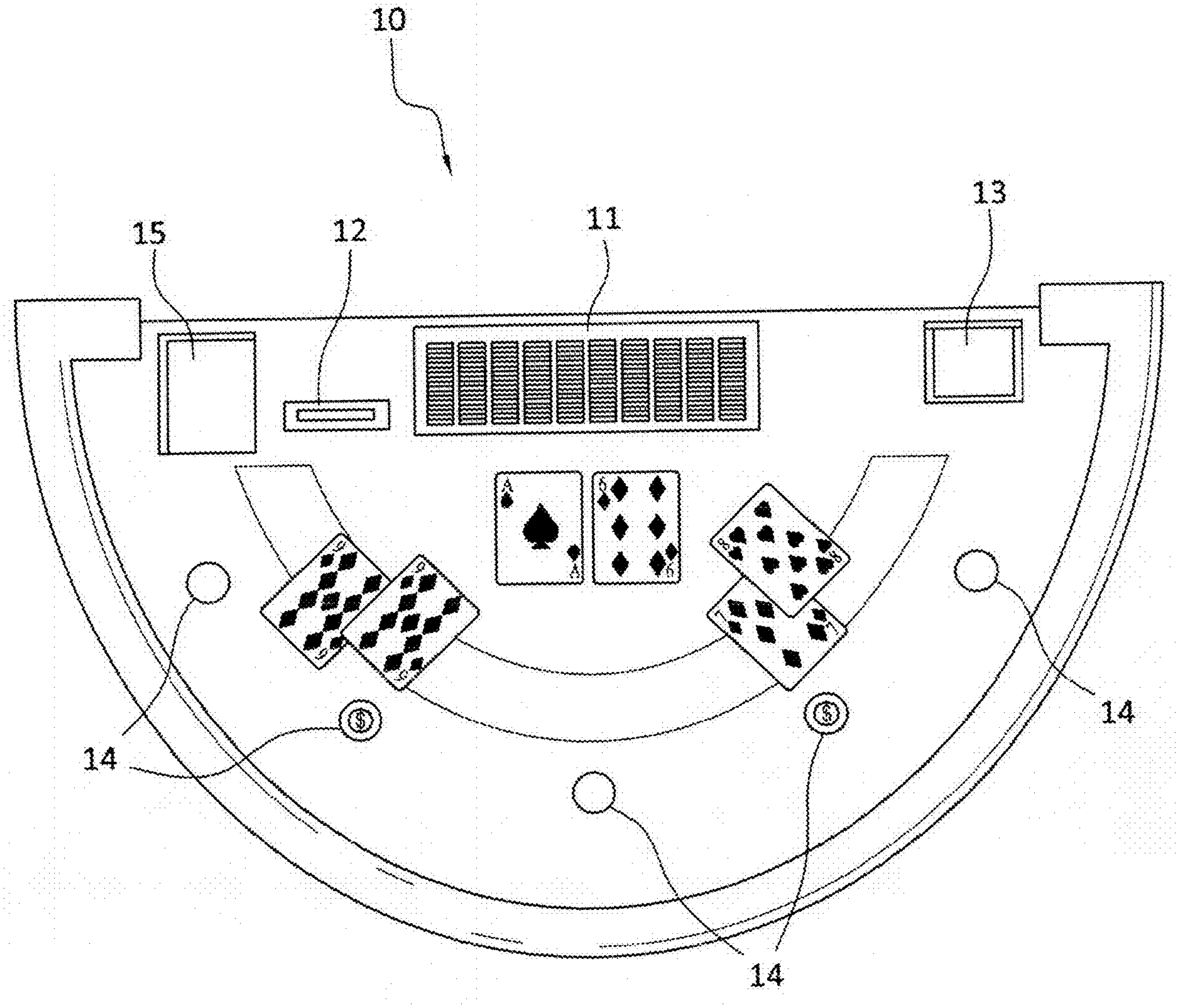
FIG. 3 shows a dealt hand on a blackjack table, with the dealer's hole card exposed to reveal a "soft" 17.

In a typical round of blackjack, each player makes a bet in a betting circle 14 (as shown in FIG. 3) and then the dealer deals two cards (both typically face up, as shown in FIG. 3) to each player and two cards (one typically face up and the other typically face down) to the dealer.

After receiving the initial two cards and after seeing the dealer's face up card, each player chooses to "hit," "stand," "double down," or "split." A "hit" results in another card from the dealer. If a player chooses to "hit," then after the player's first hit, the player can choose to "hit" again as many times as the player desires. A "stand" results in no more cards from the dealer. A "double down" allows a player to increase his or her initial bet by up to 100% in exchange for committing to stand after receiving one more card. A "split" can occur when the player's first two cards are the same value. In that case, the player has the option of splitting the two cards into two separate hands and placing a second bet equal to the player's initial bet next to the initial bet. If the player chooses to "split," then the dealer deals an additional card for each of the player's two separate hands, after which the player plays out the two separate hands in turn, where the player can choose to "hit," "stand," "double down," or "split" for each hand.

Figure 2:
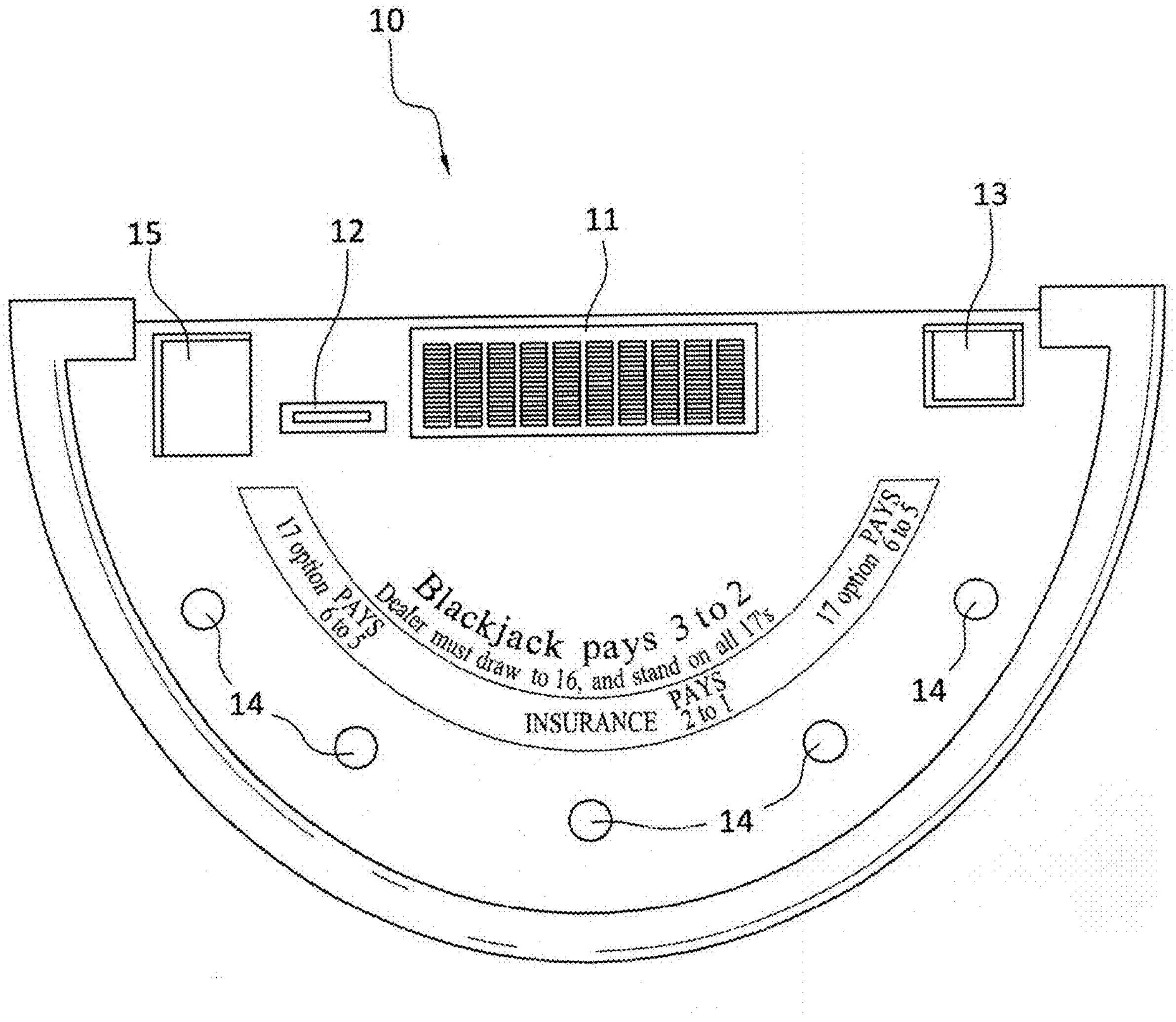
FIG. 2 shows the layout of a blackjack table with the Stand "Hard 17" Option Wager.

After all the players have exhausted the standard options discussed above (hit, stand, double down, or split), and at least one of the players has not busted, the dealer must hit until the dealer's cards total seventeen or more points. The present invention adds another option for players when the dealer stands on a "soft" seventeen, i.e. a hand containing an ace (counted as eleven) and one or more other cards totaling six. FIG. 2 shows the layout of a typical blackjack table 10 with the Stand "Hard 17" Option Wager.

Figure 6:
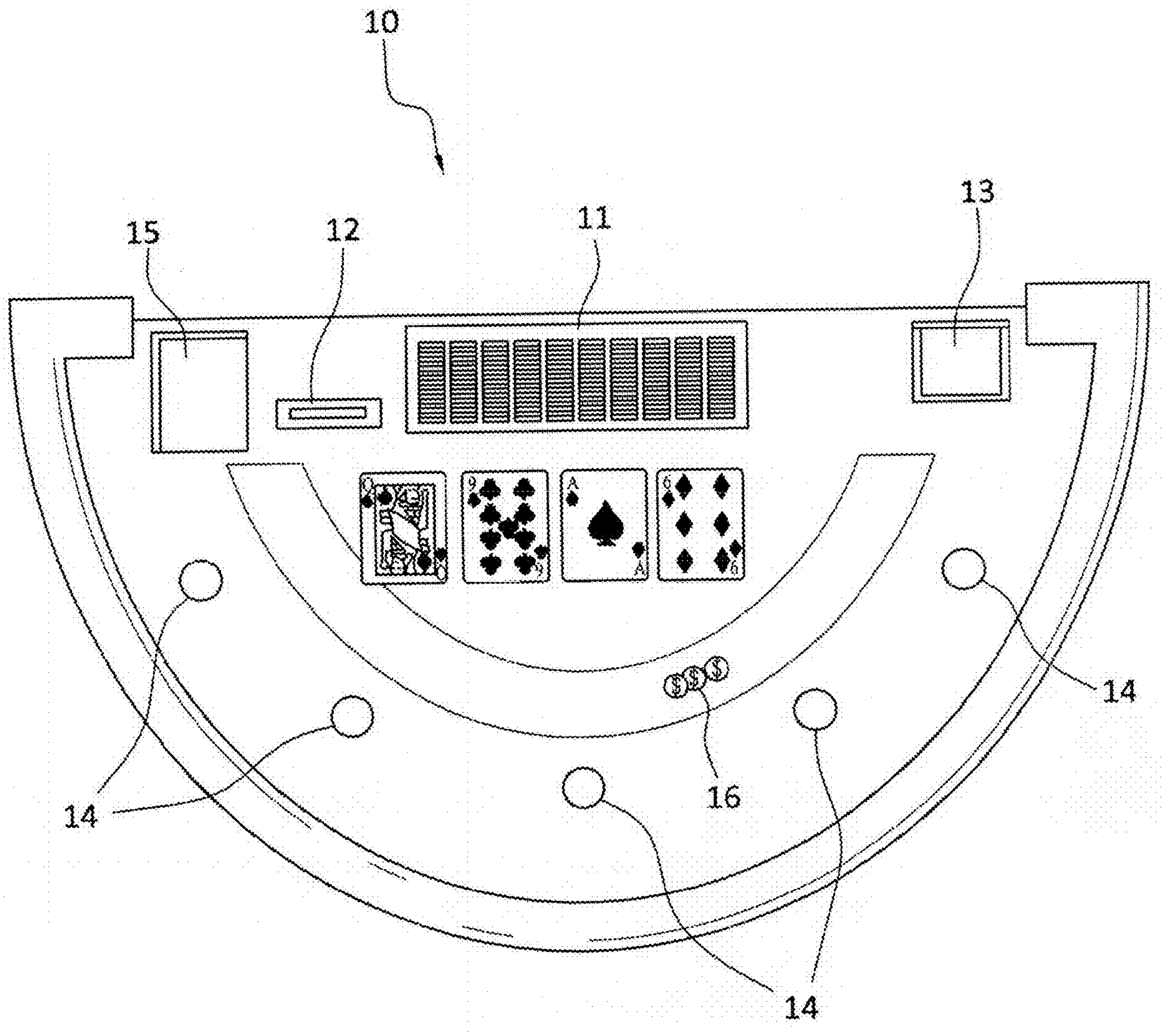
FIG. 6 shows the outcome of a blackjack hand when the dealer busts.
Figure 7:
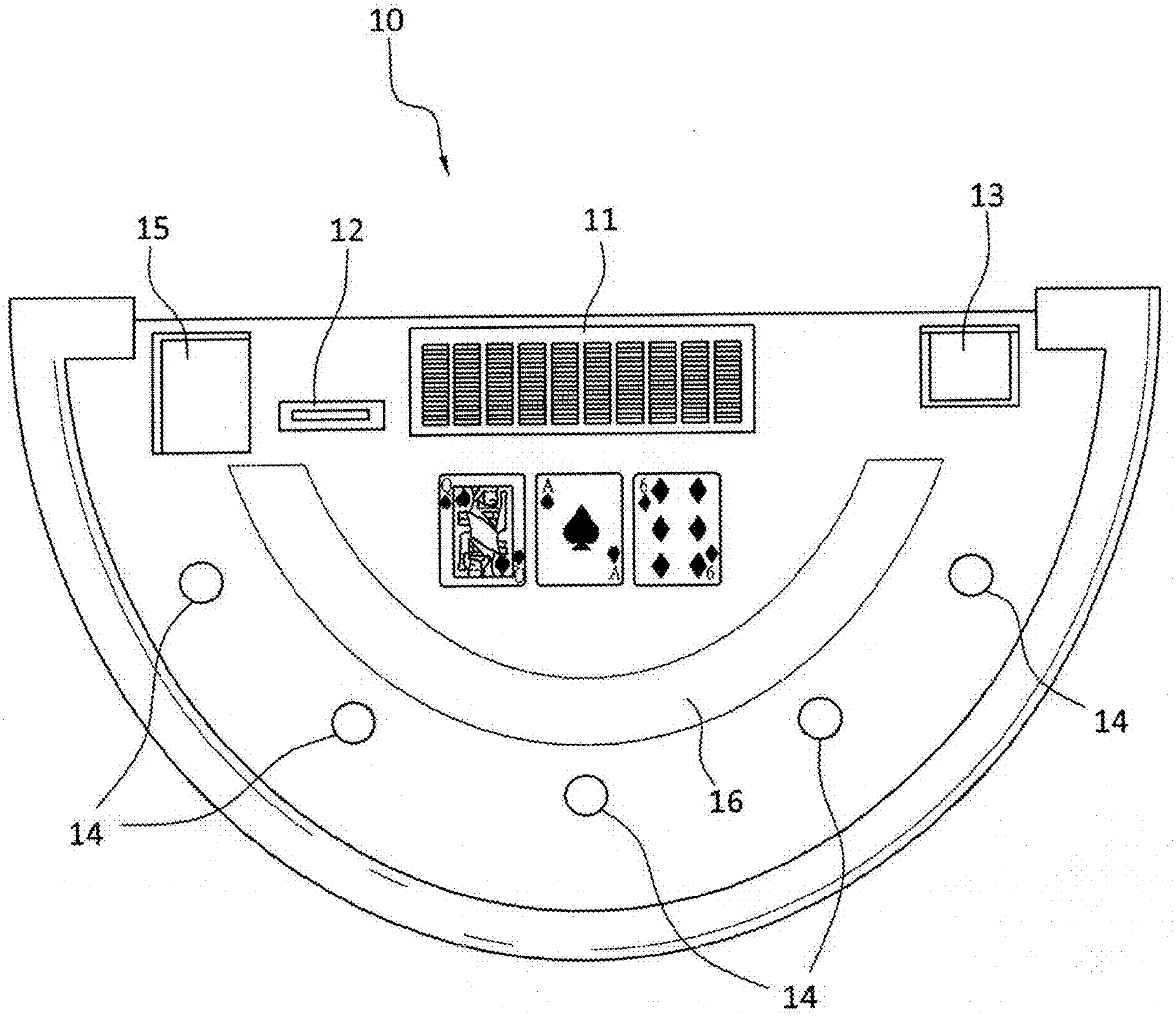
FIG. 7 shows the outcome of a blackjack hand when the dealer makes a "hard" 17.

According to the present invention, when the dealer stands on a "soft" seventeen, as shown in FIG. 3, then the players who have not busted or who have scored a blackjack in that particular round are given the option of placing a separate bet on the dealer's "soft" seventeen. The separate bet on the dealer's "soft" seventeen is procedurally identical to "buying" insurance against the dealer scoring a blackjack when the dealer's up card is an ace. The separate bet on the dealer's "soft" seventeen is preferably placed in a designated place 16 adjacent to the insurance line, as shown in FIGS. 4 through 7. If any of the eligible players choose to place a separate bet on the dealer's "soft" seventeen, then the dealer will first pay each player whose total number of points is higher than seventeen but lower than twenty-two (as shown by the player who has two nines in FIG. 4), then the dealer will take a hit on the dealer's "soft" seventeen until the dealer's hand either busts (goes over twenty-one, as shown in FIG. 6) or until the dealer's hand reaches a hard seventeen, eighteen, nineteen, twenty, or twenty-one (as shown in FIG. 7). A hard seventeen, eighteen, nineteen, twenty, or twenty-one is a hand containing an ace (counted as one) and one or more other cards totaling sixteen, seventeen, eighteen, nineteen, or twenty, respectively. If the dealer's hand busts (goes over twenty-one, as shown in FIG. 6), then a player wins the separate bet on the dealer's "soft" seventeen. However, if the dealer's hit results in a hard seventeen, eighteen, nineteen, twenty, or twenty-one (as shown in FIG. 7), then the player loses the separate bet on the dealer's "soft" seventeen.

Figure 4:
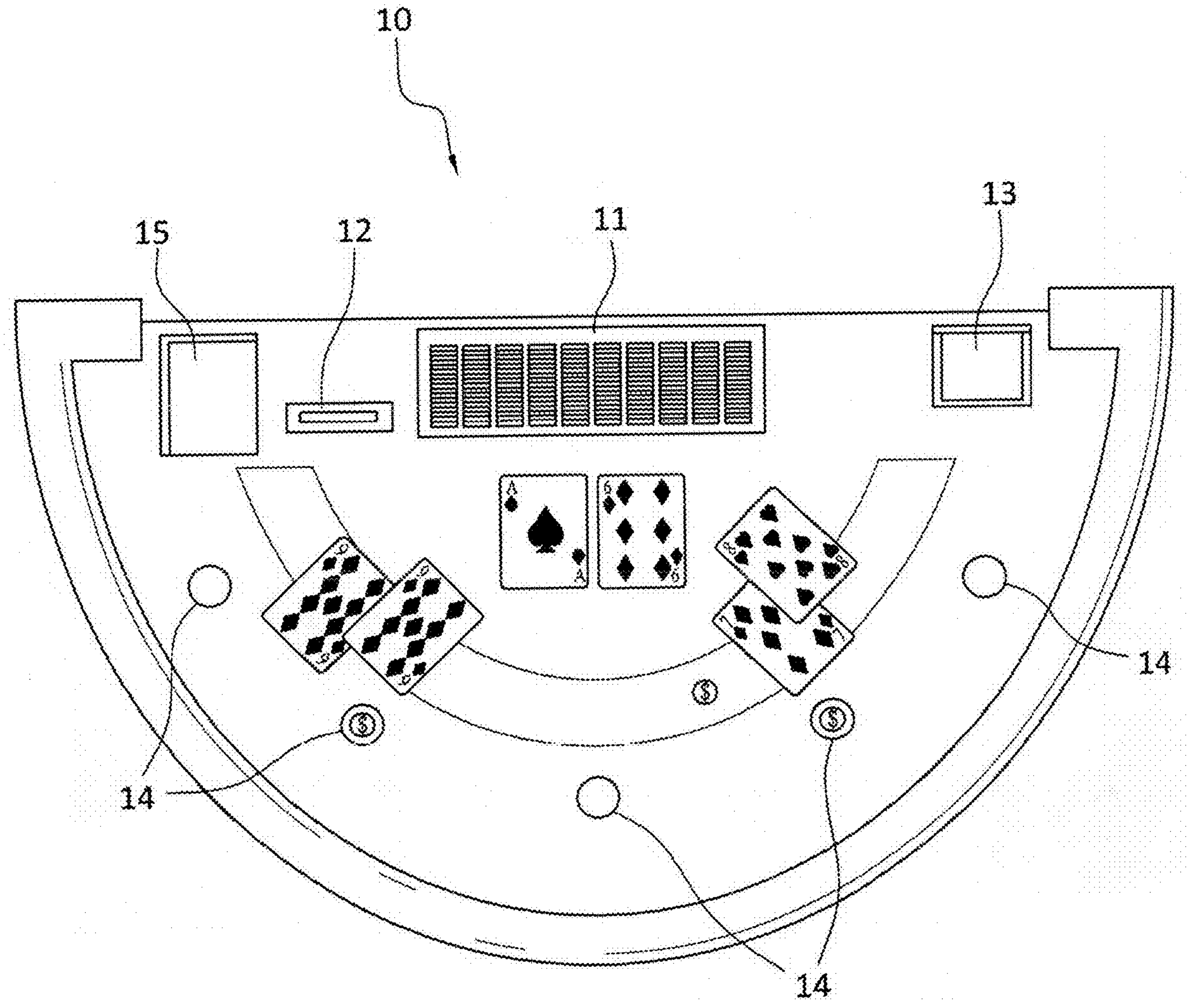
FIG. 4 shows the components of a dealt hand on a blackjack table.
Figure 5:
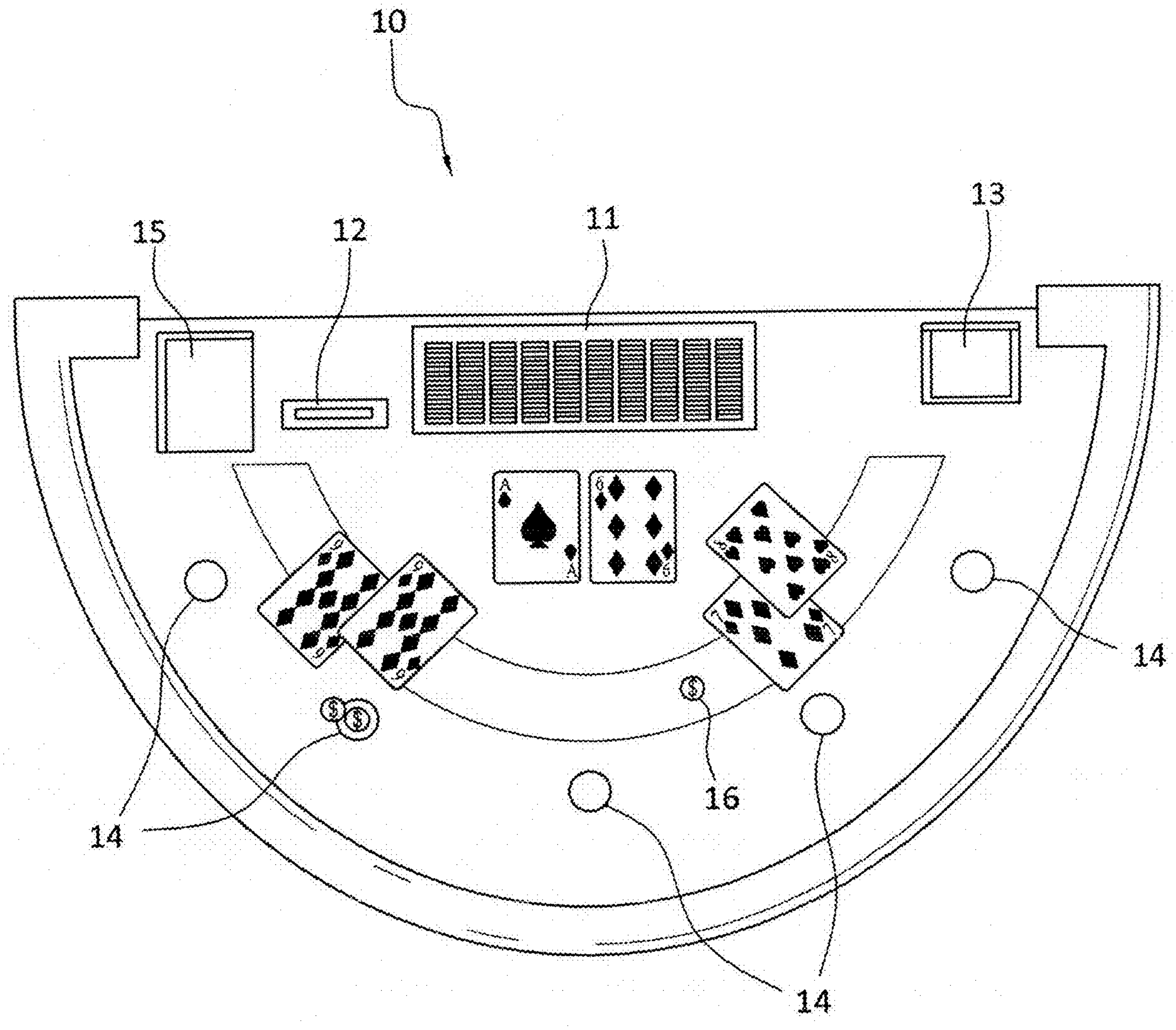
FIG. 5 shows the take and pay procedure of a blackjack hand.

The present invention is further illustrated with the following example. Assume that a blackjack player stands on fifteen (as shown by the player who has a seven and an eight in FIG. 4) after seeing the dealer's up card of six. Assume further that the dealer's down card is an ace (as shown in FIG. 4), which, when added to the six, gives the dealer a "soft" seventeen. When the dealer stands on the "soft" seventeen, the player who stood on fifteen loses. However, that player can choose to make a separate bet 16 on the dealer's "soft" seventeen (as shown in FIG. 4). If the player chooses to make a separate bet 16 on the dealer's "soft" seventeen, then the dealer hits the dealer's hand until the dealer's hand reaches a "hard" seventeen or higher.

In the current example, the dealer has an ace and a six, which is seven hard points and seventeen soft points. If the dealer takes a hit and draws a nine, then the dealer has fifteen hard points and must take another hit. If the dealer takes another hit and draws a ten (as shown in FIG. 6), then the dealer busts with twenty-six hard points and the player with fourteen points wins the separate bet on the dealer's "soft" seventeen.

It is understood that one embodiment of the present invention has been disclosed by way of example and that other modifications and alterations may occur to those skilled in the art without departing from the scope and spirit of the present invention.

What is claimed is:

1. A method for playing a card game between at least one player and a dealer comprising the steps of:

(a) providing a semicircular playing surface for said game, said playing surface providing positions for a plurality of players along the curved part of the semicircular playing surface and a position for a dealer on the straight side of the semicircular playing surface, said playing surface having a chip rack, a currency slot, a dealer card shoe, one or more betting circles, a used card shoe, and a phrase referring to a 17 option bet;

(b) providing at least one standard fifty-two-card deck having four suits (clubs, spades, diamonds, and hearts) and, for each suit, having an Ace, nine numbered cards two through ten, and three face cards (Jack, Queen, and King);

(c) assigning each of said Aces a point value of one or eleven, assigning said numbered cards two through ten a point value equal to their numerical face value, and assigning each of said face cards a point value of 10;

(d) beginning each round of play by allowing each player to make an initial bet;

(e) continuing each round of play with the dealer providing each player and the dealer a first card, with the face of all first cards to all the players and the dealer exposed, whereby all the players and the dealer may determine the point value of all first cards;

(f) continuing each round of play with the dealer providing each player and the dealer a second card, with the face of all of the players' second cards exposed to all the players and the dealer, whereby all the players and the dealer may determine the point value of all the players' second cards, and with the face of the dealer's second card being face down so that only the dealer can determine the point value of the dealer's second card;

(g) continuing each round of play by allowing each player in turn to either hit one or more times, stand, double down, or split, where a hit results in another card from the dealer, where a stand results in no more cards from the dealer, where a double down allows the player to increase the player's initial bet by up to 100% of the initial bet in exchange for committing to stand after receiving one more card from the dealer, and where a split provides a player whose first two cards are the same face value the option of splitting the two cards into two separate hands and placing a second bet equal to the player's initial bet next to the initial bet, after which the dealer deals an additional card for each of the player's two separate hands, after which the player is allowed to either hit one or more times, stand, double down, or split for each of the player's two separate hands;

(h) continuing each round of play for those players who have not been dealt cards having a combined point value greater than twenty-one, where the dealer adds zero or more cards to the dealer's two cards until the combined point value of the dealer's cards are at least seventeen;

(i) continuing each round of play when the dealer's cards include an Ace and one or more other cards, where the one or more other cards have a combined point value of six, by providing each player whose cards do not have a combined point value greater than twenty-one the option of placing a separate bet on the dealer's cards; and (j) continuing each round of play when at least one player has chosen the option of placing a separate bet on the dealer's cards by having the dealer pay a standard payout to each player whose cards have a combined point value of greater than seventeen but less than twenty-two, after which the dealer adds one or more cards to the dealer's cards until the dealer's cards include an Ace and a separate group of cards, where the dealer's separate group of cards has a combined point value greater than fifteen, at which point if the dealer's separate group of cards has a combined point value greater than fifteen but less than twenty-one, then each player who chose the option of placing a separate bet on the dealer's cards loses the separate bet, and if the dealer's separate group of cards has a combined point value greater than twenty, then each player who chose the option of placing a separate bet on the dealer's cards wins the separate bet.

2. The method of playing a card game according to claim 1, including the further step of defining blackjack as a hand having only two cards with a combined point value of exactly twenty-one.

3. The method of playing a card game according to claim 2, where the positions for a plurality of players comprises five separate positions.

4. The method of playing a card game according to claim 2, where the positions for a plurality of players comprises seven separate positions.

* * * * *